United States Patent
Nourian

(10) Patent No.: US 9,587,778 B2
(45) Date of Patent: Mar. 7, 2017

(54) CLAMP AND SPIKE FOR FLEXIBLE CONDUIT

(75) Inventor: Daniel Nourian, Reedley, CA (US)

(73) Assignee: National Diversified Sales, Inc., Fresno, CA (US)

( * ) Notice: Subject to any disclaimer, the term of this patent is extended or adjusted under 35 U.S.C. 154(b) by 1147 days.

(21) Appl. No.: 13/038,058

(22) Filed: Mar. 1, 2011

(65) Prior Publication Data

US 2012/0223156 A1 Sep. 6, 2012

(51) Int. Cl.
*F16L 41/06* (2006.01)
*F16L 47/34* (2006.01)

(52) U.S. Cl.
CPC ............ *F16L 41/065* (2013.01); *F16L 47/345* (2013.01)

(58) Field of Classification Search
CPC ........ F16L 47/345; F16L 41/065; B05B 15/00
USPC ................ 239/542; 403/283, 282, 281, 280; 285/197, 180
See application file for complete search history.

(56) References Cited

U.S. PATENT DOCUMENTS

| | | | | |
|---|---|---|---|---|
| 2,344,163 A * | 3/1944 | Misch | ............................ | 285/198 |
| 3,495,615 A * | 2/1970 | Ehrens et al. | ................ | 137/318 |
| 3,554,217 A * | 1/1971 | Ehrens et al. | ................ | 137/318 |
| 3,606,157 A * | 9/1971 | Chapin | ......................... | 239/209 |
| 3,767,121 A * | 10/1973 | Campbell | ..................... | 239/272 |
| 5,022,421 A * | 6/1991 | Johnson | ..................... | 137/15.13 |
| 5,694,972 A * | 12/1997 | King | .............................. | 137/318 |
| 7,219,684 B2 * | 5/2007 | Dabir et al. | ................... | 137/318 |

* cited by examiner

*Primary Examiner* — Arthur O Hall
*Assistant Examiner* — Chee-Chong Lee
(74) *Attorney, Agent, or Firm* — David J. Pitman; Fulwider Patton LLP

(57) ABSTRACT

A clamp and spike combination for use in conjunction with a flexible conduit, comprising a spike including an inlet rod with a sharpened tip for penetration into the conduit, an outlet rod connected to the inlet rod, the outlet rod having a barbed tip for attachment to a tube. The bore extends through the rods from the sharpened tip to the barbed tip, whereby the spike provides a channel for the passage of fluid. Further included, a clamp including two legs extending substantially parallel with each other and spaced apart from each other by a distance, an apex portion connecting the two legs to each other so that the clamp is shaped substantially in the form of an inverted "U"; and an opening in the apex portion, the opening being sized to receive the inlet rod of the spike.

2 Claims, 5 Drawing Sheets

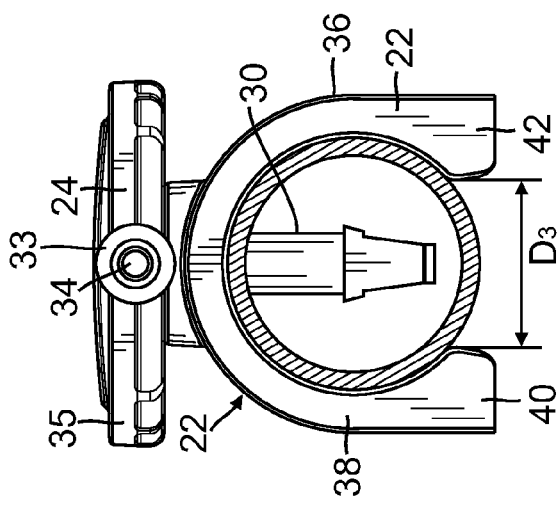
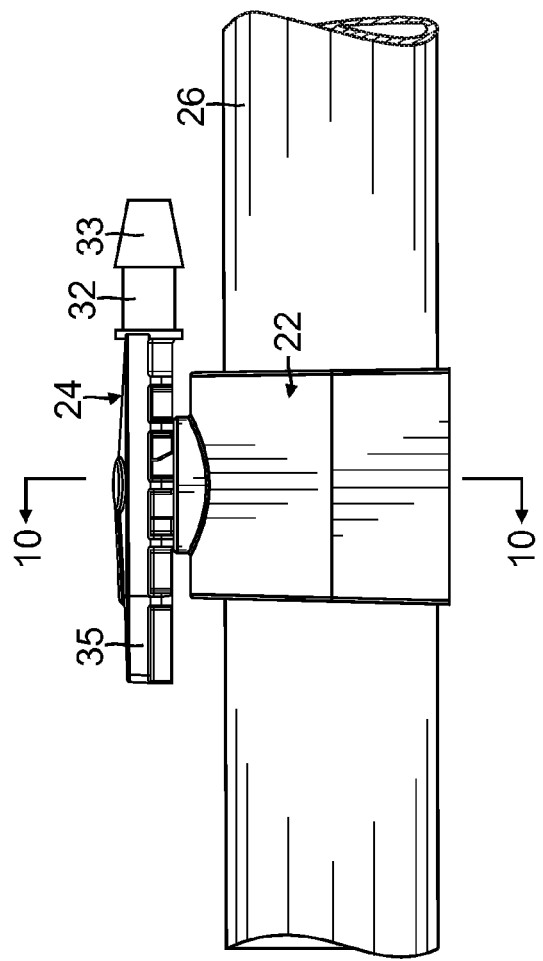
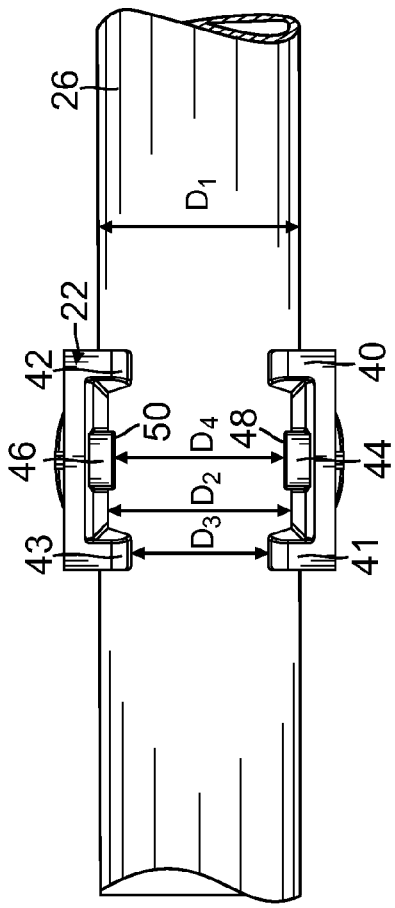

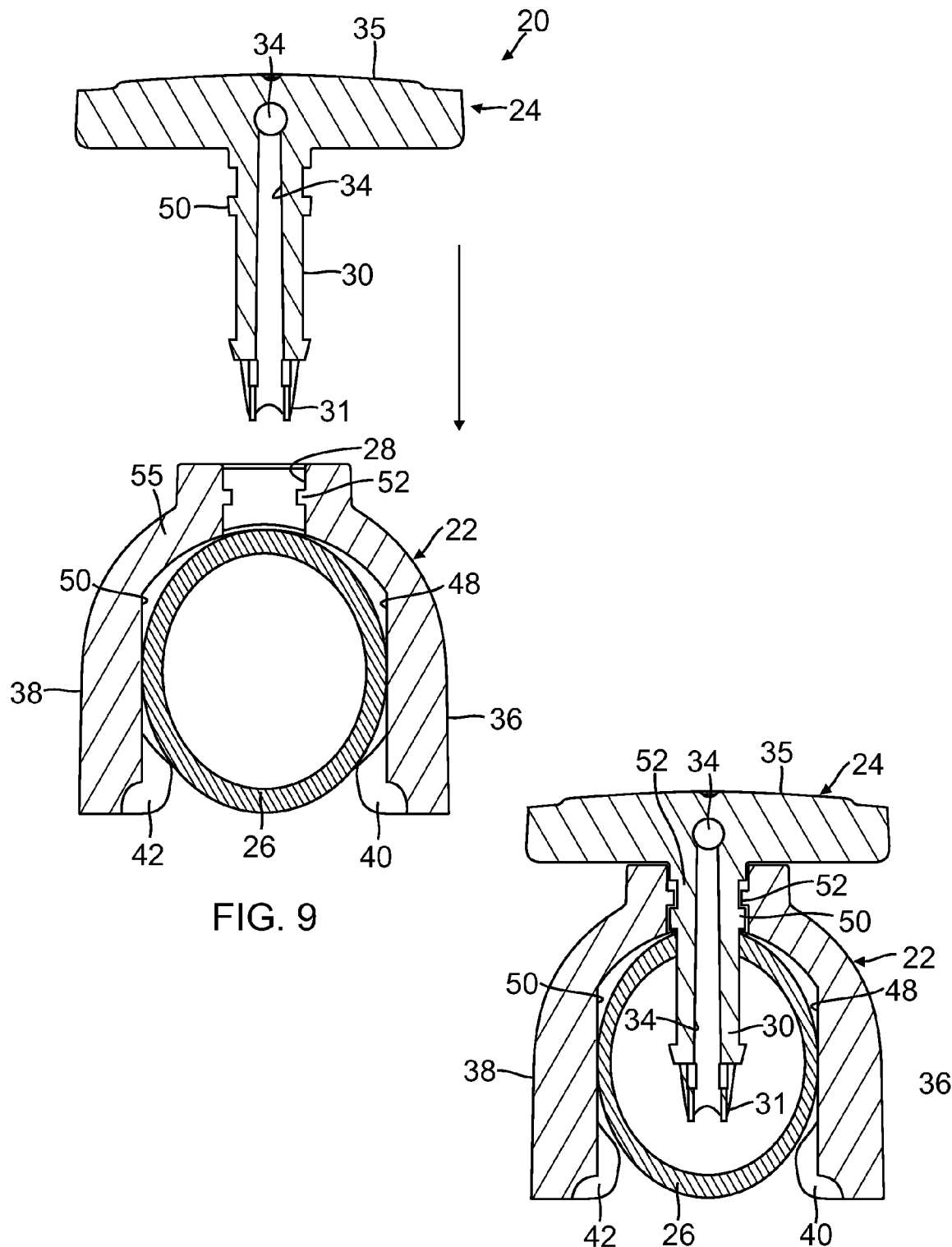

CLAMP AND SPIKE FOR FLEXIBLE CONDUIT

BACKGROUND

The present invention relates to a device and method for facilitating the insertion of a hollow spike into a flexible conduit.

In recent years, the demand for water to irrigate gardens and public spaces has grown exponentially. However, the supply of water has remained constant, or has declined. Therefore, ever more systems are being developed to apply the limited amount of water available. One such system is the "low flow" system which takes water along a ¼ inch tube to, for example, a bubbler and/or to another low flow emitter such as a micro sprayer, which is an outlet adapted to discharge water directly at the root of a plant with a smaller coverage diameter than the average irrigation sprinkler. The advantages of such a system include the fact that water conveyance efficiency is near 100 percent because wind and evaporation are denied their usual effect on water loss. This may provide for a shortened required time of irrigation, and thus reduces power costs. Furthermore, bubbler outlets are not easily blocked, and the low flow system provides a high water application efficiency.

In order to convert existing water distribution systems to be capable of low flow irrigation, it is generally necessary to tap into an existing water conduit with a hollow lower spike that includes an upper barbed tip configured to receive a flexible ¼ inch pipe that leads off to a low flow irrigation emitter.

One of the problems encountered in converting an existing water distribution system to be capable of low flow bubbler irrigation is that inserting the hollow spike into an existing water conduit is attended with considerable difficulty. First, it is difficult to apply pressure to a sharpened tip of a typical spike because a radially outwardly extending barbed tip on an opposite external end of the spike makes it difficult for a user to gain a suitable grip on the body of the spike without injuring himself. Second, the sharpened tip of the spike has a tendency to slip off the rounded conduit surface when pressure is applied, thereby introducing the danger of injury to the installer via the sharpened tip. Third, if the sharpened tip of the spike is not sufficiently sharp, pressure applied to the spike has a tendency to buckle the surface of the water conduit rather than pierce into it. This tendency may vary according to the relative stiffness of the water conduit, and in some cases a separate metal piercing tool must be used to initiate a hole. However, although a stiffer pipe has a smaller tendency to buckle, such pipes are more difficult to pierce and therefore increase the tendency of the spike to slide off the rounded conduit surface and potentially injure the installer. Fourth, once the spike is inserted into a conduit, any bump or knock against the spike tends to damage the seal that results between spike and conduit so that a leak tends to develop.

Therefore, there is a need in the art for a system and method for facilitating the insertion of a hollow spike through the surface of a water conduit that solves the problems in the prior art. The present invention addresses these and other needs.

SUMMARY OF THE INVENTION

The present invention is described, in its preferred embodiments.

In a first aspect, the invention is a clamp and spike combination for use in conjunction with a flexible conduit that has a standard diameter having a magnitude of a first distance. In the preferred embodiment, the combination comprises a spike including an inlet rod with a sharpened tip for penetration into the conduit. An outlet rod is connected to the inlet rod, the outlet rod having a barbed tip for attachment to a tube. A bore extends through the rods from the sharpened tip to the barbed tip, whereby the spike provides a channel for the passage of fluid. The combination further has a clamp including two legs extending substantially parallel with each other and spaced apart from each other by a maximum spacing having a second distance. The second distance is substantially equal to the first distance, by which it is meant herein that the second distance is sized to snugly receive a conduit of standard diameter having a magnitude of a first distance. An apex portion connects the two legs to each other so that the clamp is shaped substantially in the form of an inverted "U." The apex portion defines an opening sized to receive the inlet rod of the spike, whereby the inlet rod of the spike is receivable through the opening in the apex portion to penetrate a received conduit. Thus, the clamp, once mounted on a conduit, advantageously provides a fixed and secure opening above the conduit. A user may safely insert a sharpened portion of the spike through the opening and safely force the spike into the conduit without concern that the spike will slip off the rounded conduit and physically injure the hand holding the conduit. Once the spike has safely penetrated the conduit, the clamp provides a support against bending and removal of the spike from the conduit.

In another aspect of the combination, the outlet rod extends substantially perpendicular to the inlet rod. This addresses a problem in the prior art where spikes tend to be linear, thus presenting the user with a sharp portion against which to apply manual pressure to penetrate the spike into the conduit. In yet a further aspect, the spike includes a plate attached to the spike and extending substantially perpendicular to the inlet rod, the plate being configured to facilitate and permit a user to apply a force on the spike along the axis of the inlet rod with the palm of a hand.

In another aspect of the combination, each leg of the clamp includes, at a terminal end of the leg opposite the apex, a foot extending towards the foot on an opposite leg so that the two feet are separated from each other by a third distance that is smaller than the second distance, and thus also smaller than the standard diameter of a received conduit, whereby a standard diameter conduit received between the two legs is restrained against removal from the clamp by the two feet. This has the advantage of securely fixing the clamp in relation to the conduit and spike at all material times during installation and use. Also preferred, the clamp has a first elongate width and further includes two opposing shaping surfaces, each shaping surface attached to a leg and having a second elongate width that is smaller than the first width, the shaping surfaces being spaced apart from each other by a fourth distance smaller than the second distance, whereby a conduit of standard diameter received between the two legs is compressed out of circular shape by the shaping surfaces. Preferably, the fourth distance is not more than 90 percent of the second distance, and the second width is not more than 30 percent of the first width.

In yet another preferred aspect of the combination, mating detents are positioned in the opening and on the inlet rod, whereby the spike is restrained from removal from the clamp once the spike is received by the clamp.

Another facet of the invention comprises a clamp, for use in combination with a spike and a flexible conduit that has a standard diameter having magnitude of a first distance. In this facet, the clamp comprises two legs extending substantially parallel with each other and spaced apart from each other by a second distance. An apex portion connects the two legs to each other so that the clamp is shaped substantially in the form of an inverted "U." An opening is provided in the apex portion, the opening being sized to receive a portion of the spike. The second distance is sized to snugly receive a conduit of standard diameter between the legs, whereby the portion of the spike is receivable through the opening in the apex portion to penetrate a received conduit. Each leg includes, at a terminal end of the leg opposite the apex, a foot extending towards the foot on an opposite leg so that the two feet are separated from each other by a third distance that is smaller than the second distance, and also smaller than the diameter of a received conduit, whereby a conduit of standard diameter received between the two legs is restrained against removal from the clamp by the two feet. In a preferred embodiment, the clamp has a first elongate width and further includes two opposing shaping surfaces, each shaping surface attached to a leg and having a second elongate width smaller than the first width, the shaping surfaces being spaced apart from each other by a fourth distance smaller than the second distance, whereby a conduit of standard diameter received between the two legs is compressed out of circular shape by the shaping surfaces. Preferably, the fourth distance is not more than 90 percent of the second distance, and the second width is not more than 30 percent of the first width.

In yet a further facet, the invention is a spike for use in conjunction with a flexible conduit. The spike comprises an inlet rod with a sharpened tip for penetration into the conduit, and an outlet rod connected to the inlet rod, the outlet rod having a barbed tip for attachment to a tube. A bore extends through the rods from the sharpened tip to the barbed tip, whereby the spike provides a channel for the passage of fluid. The outlet rod extends substantially perpendicular to the inlet rod and a plate is attached to the spike and extends substantially perpendicular to the inlet rod, the plate being configured to facilitate a user applying a force on the spike along the axis of the inlet rod with the palm of a hand.

These and other advantages of the invention will become more apparent from the following detailed description thereof and the accompanying exemplary drawings.

BRIEF DESCRIPTION OF THE DRAWINGS

FIG. 6 is a front elevational view of the clamp and spike of FIG. 1.

FIG. 7 is a side elevational view of the spike and clamp of FIG. 1

FIG. 8 a bottom surface view of the spike and clamp of FIG. 1.

FIG. 9 is a sectional view of a spike and clamp as seen in FIG. 1, with the spike shown in disengaged condition.

FIG. 10 is a sectional view taken substantially along the line 10-10 of FIG. 6.

DETAILED DESCRIPTION OF THE PREFERRED EMBODIMENTS

Figure 1:
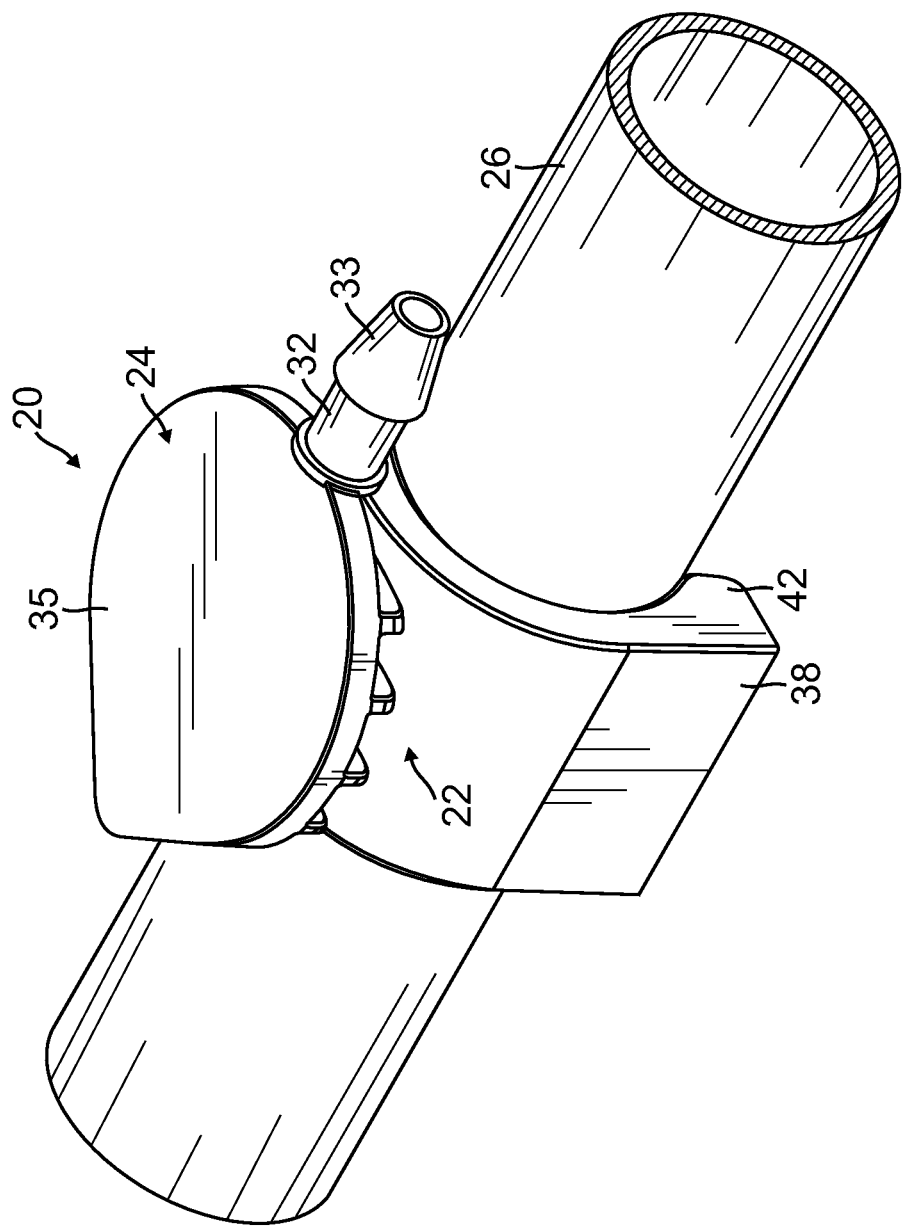
FIG. 1 is a perspective view of a clamp and a spike for water conduit having features of the present invention, shown in combination with a water conduit.
Figure 2:
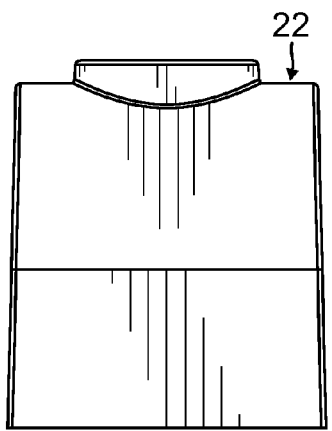
FIG. 2 is a front elevational view of the clamp seen in FIG. 1

With reference to the drawings, a preferred embodiment of a clamp and spike combination 20 having features of the present invention is described. FIG. 1 exemplifies the final configuration of the novel clamp 22 and spike 24 as used in combination 20 under the system and method of the present invention. Both clamp and spike are seen in conjunction with a water conduit 26, into which a portion of the spike 24 has been inserted through an opening in the clamp, while the clamp 22 has been mounted on the conduit as described herein below.

With reference to the drawings, the preferred configuration of the spike 24 of the present invention (best seen in FIGS. 9 and 10) includes a hollow inlet rod 30 with a sharpened tip 31 adapted for penetrating or expanding a hole in a water conduit 26. The spike also includes a hollow outlet rod 32 (FIGS. 1 and 6) with a barbed tip 33, the outlet rod preferably extending at a substantially right angle to the inlet rod 30. Substantially, in this context permits a variation of plus or minus 15 degrees from a true right angle. The spike 24 defines a bore 34 that extends from the sharpened tip 31 of the inlet rod 30, to the barbed tip 33 of the outlet rod 32. The inlet rod 30 is configured to have a tip 31 that is sufficiently sharp that a downward force applied to the spike 24 will cause the inlet rod 30 to penetrate and be inserted into an irrigation conduit 26. Once the spike is inserted into the conduit 26 (FIG. 10), the bore 34 through the spike provides a channel for water to flow from the conduit out to a flexible tube (not shown) attached to the barbed tip 33, and onwards to an irrigation head (not shown). A further preferred aspect of the spike of the present invention is that it includes a pressure plate 35 shaped to fit comfortably into the palm of a user's hand and extending substantially perpendicular to the inlet rod, whereby the user may assert a downward force on the spike along the axis of the inlet rod 30 sufficient to penetrate the sharpened tip 31 into a conduit, without the barbed tip of the spike pointing generally upwardly towards the hand.

Figure 3:
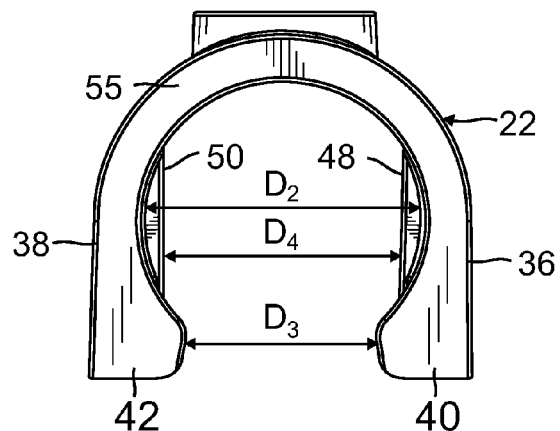
FIG. 3 is a side elevational view of the clamp of FIG. 2.
Figure 4:
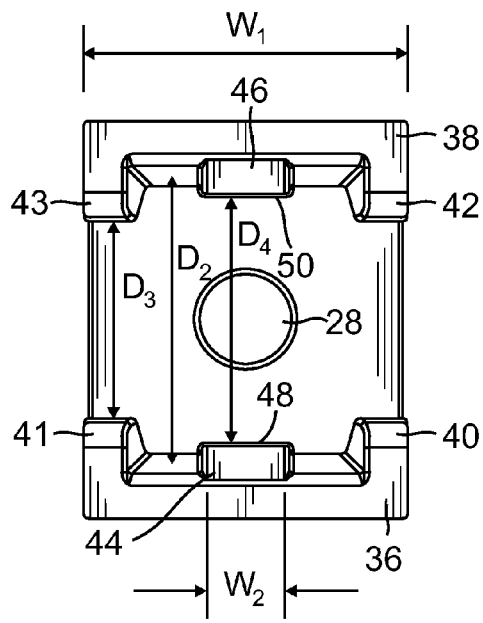
FIG. 4 is a bottom view of the clamp of FIG. 2.
Figure 5:
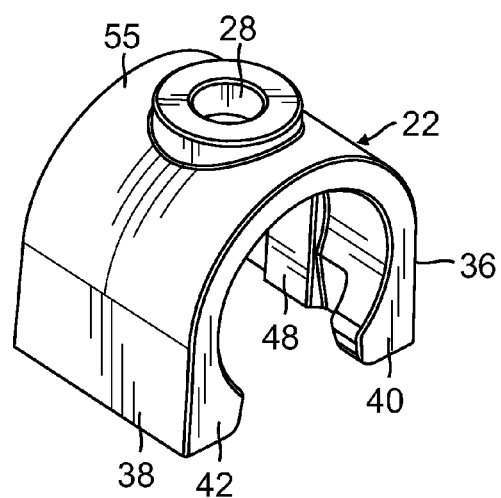
FIG. 5 is a perspective view of the clamp of FIG. 2.

The clamp 22 of the present invention includes two legs 36, 38 connected to each other by an apex portion 55 to form a saddle-shaped structure substantially in the form of an inverted "U." The legs are separated from each other by an internal distance "D2" as seen in FIGS. 3, 4, and 8, which is preferably substantially the same as the diameter "D1" of a standard diameter conduit onto which the clamp is designed to be attached, as indicated in FIGS. 6-8. When used as intended, the clamp 22 is mounted downwardly onto a standard diameter conduit 26 having diameter "D1," with the two legs 36, 38 straddled on either side of the conduit 26, as seen in the figures, so that the diameter of the conduit "D1" fits snugly between the legs that are spaced apart by the distance "D2."

A first advantageous feature of the clamp 22 is that it provides a secure and stable opening 28 at the apex portion 55 through which the sharpened tip 31 of the inlet rod 30 of the spike 22 may be inserted before pressure is applied to the spike via the pressure plate 35 for penetrating the sharpened tip 31 into the conduit 26.

When used, the clamp 22 may first be mounted on the conduit 26, while the spike is withdrawn and separate from the clamp, as seen in FIG. 9. Once the clamp is securely mounted on the conduit, the tip 31 of the sharpened rod 30 of the spike may be inserted through the opening 28 at the apex of the clamp, and pressure may be applied to the spike via the pressure plate 35 until the sharpened tip 31 of the inlet rod 30 penetrates the conduit 26, as exemplified in FIGS. 7 and 10. (Under certain circumstances, a metal piercing tool may first be used to initiate a hole in the conduit.) The presence of the opening 28 in a fixed position above the surface of the conduit advantageously prevents the sharpened tip 31 from sliding off the rounded conduit during penetration, which may occur with an attendant risk of physical injury to the user when the spike is forced directly onto a rounded conduit surface without the benefit of the clamp 22 of the present invention. In its final penetrated state (FIG. 10), the spike 24 provides a channel via the bore 34 for water to flow from the conduit 26 to a flexible pipe (not shown) attached to the barbed tip 33 of the outlet rod 32, and onwards to an irrigation head.

A further preferred advantageous feature of the clamp 22 is that it may be configured to provide a means for securing the clamp to a conduit so that the clamp remains firmly attached to the conduit after being mounted thereon. In furtherance of this advantage, each of the two legs 36, 38 includes, at a terminal end of each leg opposite the apex 55, at least one inturned foot 40, 42 respectively. Each inturned foot extends inwardly, preferably towards the other foot, underneath the "belly" of the conduit, so that an internal space "D3" between the feet, as indicated in FIGS. 3, 4, 7, and 8, is smaller than the maximum internal spacing "D2" between the legs 36, 38 (and also, therefore, smaller than the standard diameter D1 of the conduit onto which the clamp is designed to be mounted.) Thus, when the clamp 22 is being mounted on the conduit 26, the clamp is first brought into contact with the conduit so that both feet touch the conduit. The clamp is then pushed forcibly down onto the conduit, so that the feet are forced slightly apart, and a bending moment is set up in the clamp with maximum bending moment taking place at the apex. When the feet are opened up sufficiently, the conduit (which at this point may itself undergo a slight amount of deformation) slips up into the opening between the legs, and is trapped in the opening by the feet 40, 42 which snap together again under the belly of the conduit. The feet 40, 42 and the legs 36, 38 may further be shaped to provide a portion of a circular opening, suitable for holding the conduit securely as seen in FIG. 7. Thus, once the clamp 22 is mounted on the conduit 26, only a concerted force will be able to dislodge the clamp from the conduit. Therefore, a secure support in the form of the opening 28 is provided above the surface of the conduit to hold the spike 24 in position, both while the spike is being forced to penetrate the conduit, and also after it has penetrated the conduit.

A yet another preferred aspect of the invention, a further advantageous feature of the clamp 22 may be provided. In this aspect, each leg 36, 38 may be provided with two feet separated from each other so that there are two sets of opposing feet, a first set 40, 42 and a second set 41, 43 as best seen in FIGS. 4 and 8. In this embodiment, one set of opposing feet 40, 42 is positioned at a forward end of the clamp and the other set of opposing feet 41, 43 is positioned at a rearward end of the clamp, with the rearward set being separated from the forward set. Preferably, in this embodiment, two opposing shaping elements 44, 46 may be attached to the legs and positioned centrally between the forward set of feet and rearward set of feet. The opposing shaping elements include shaping surfaces 48 and 50 respectively (best seen FIGS. 8, 9 and 10) that are opposing, that are preferably substantially parallel to each other, and that are separated from each other by an internal distance "D4" that is slightly smaller than the internal separation between the legs "D2," and hence slightly smaller than the standard diameter "D1" of the conduit upon which the clamp is designed to be mounted. Preferably "D4" is not more than 90 percent of "D2" the maximum separation distance between the legs. In a preferred embodiment, where the standard diameter "D1" of a conduit is 0.7 inches, and hence "D2" is about the same dimension, the internal distance "D4" between the shaping surfaces is 0.6 inches.

The effect of the shaping elements 44, 46 is that, when the clamp 22 is forced down onto a conduit 26 of diameter "D1," the shaping elements force the conduit to assume a slightly non-circular or oval shape at the elongate center of the clamp, adjacent the opening 28 at the apex. As best seen in FIGS. 9 and 10, the radius of curvature of the conduit 26 at the top of the conduit is forced to be slightly smaller than the radius of curvature half way to the bottom of the conduit. This reduction in the radius of the conduit under the opening 28, and support of the conduit along the sides provided by the shaping elements 44, 46, renders the conduit stiffer against vertical deformation at the location of the opening 28 in the clamp 22, so that the sharpened tip 31 of the spike, when pushed downward onto the conduit through the opening 28, is more likely to pierce the conduit than to cause it to buckle downwardly. In a further preferred aspect of this feature, the width of the shaping surfaces "W2" is preferably not more than 30 percent of the width of the clamp "W1," as seen in FIG. 4. This aspect of the clamp has the further advantageous result that the user is required to deform only a small portion of the conduit that is forced between the legs 38, 40, yet it is a portion that may be sufficient to prevent the conduit from buckling downwardly when the spike is forced onto and through the upper surface of the conduit. In a preferred embodiment, the width W1 of the clamp is 0.76 inches, and the width W2 of the shaping surface is 0.2 inches.

In a further preferred aspect, a further advantageous feature of the invention may be provided. In this aspect, the spike 24 may be provided with a detent 50 that preferably extends around the circumference of the inlet rod 30, while the opening 28 in the clamp is provided with an internal mating detent 52 that preferably extends around the circumference of the opening 52. When the spike is inserted into the conduit through the opening 28, as seen in FIG. 10, the two detents 50, 52 matingly engage with each other to secure the spike against working out of the hole in the conduit formed by the inlet 30 rod. This is an advantageous feature because it overcomes a problem encountered in the prior art wherein, if the spike is provided with a barbed detent for attachment directly to the conduit, that detent makes a hole in the conduit bigger than actually needed for the rod alone, and the connection may tend to leak. Furthermore, if any external force is applied to the spike in the prior art (such as a gardener bumping it with his feet) the spike will tend to pull out of the conduit, and the barbed detent on the rod, internal to the conduit, will pull against the wall of the conduit and may damage it to cause a leak. In the present invention, however, the clamp is attached to the conduit by external feet 40, 42, and the spike is held in position in relation to the conduit by detents 50, 52 which are positioned external to the conduit on the spike and the clamp. Thus, the depth of the opening 28 in the clamp 22 provides a restraint against any bending that might be applied to the spike 24, thereby further protecting and reinforcing the seal between the spike 24 and the conduit 26. Accordingly, any external rough force applied to the spike will be withstood by the clamp, rather than by the thin wall of the conduit which is otherwise prone to suffer damage.

Figure 11:
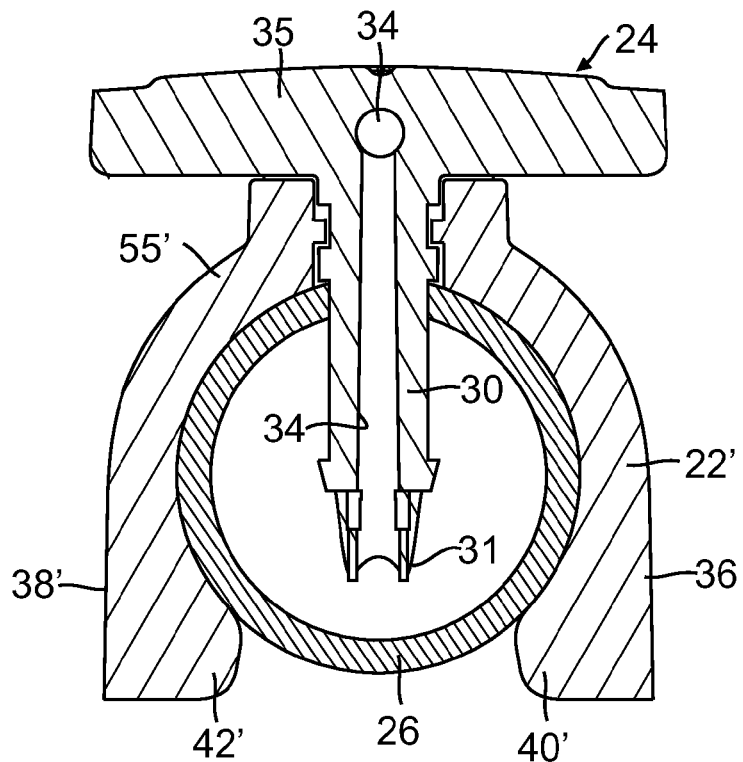
FIG. 11 is a second embodiment of the clamp in FIG. 10.
Figure 12:
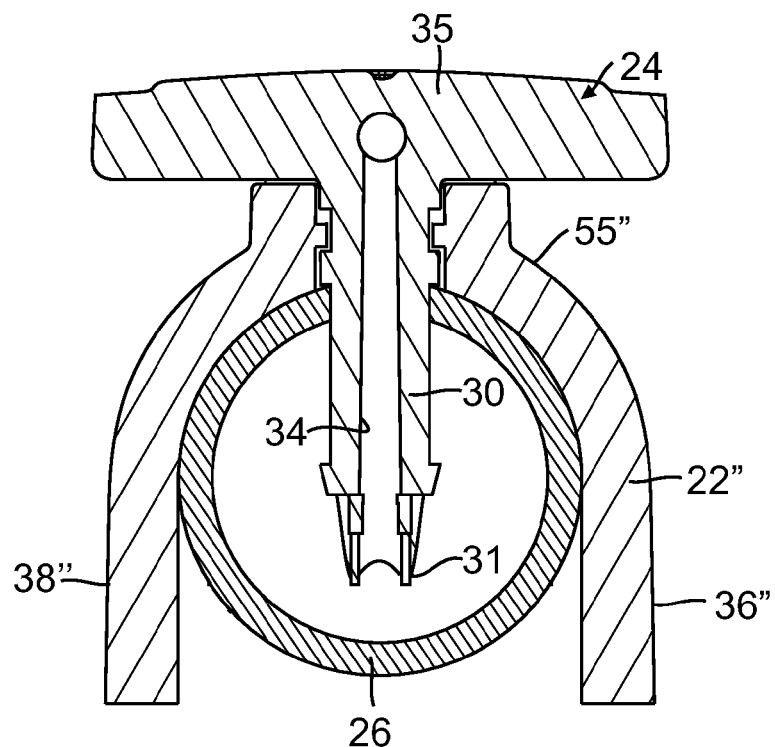
FIG. 12 is a third embodiment of the clamp in FIG. 10.

In FIGS. 11 and 12 there are shown alternative embodiments of the invention. Specifically, FIG. 11 exemplifies an embodiment of a clamp 22' that includes feet 40', 42' but does not include any shaping elements. FIG. 12 exemplifies an embodiment of a clamp 22" that includes neither feet nor shaping elements, but does include a pair of legs 36", 38" connected by an apex 55". A further embodiment (not exemplified in the drawings) may include shaping elements, but not feet. All embodiments of the spike and clamp are preferably molded from ABS, PVC, or other suitable plastic moldable material.

Thus, the clamp and spike combination of the present invention provides a novel and advantageous structure for tapping into a water conduit for the purpose of drawing off water for irrigation. The present invention may, of course, be carried out in other specific ways than those herein set forth without departing from the essential characteristics of the invention. The present embodiments are, therefore, to be considered in all respects as illustrative and not restrictive, while the scope of the invention is set forth in the claims that follow.

I claim:

1. A clamp and spike combination for use in conjunction with a flexible conduit of standard diameter, the diameter having a magnitude of a first distance, comprising:
   a spike including:
      an inlet rod with a sharpened tip for penetration into the conduit;
      an outlet rod connected to the inlet rod, the outlet rod having a barbed tip for attachment to a tube;
      wherein, a bore extends through the inlet rod and the outlet rod from the sharpened tip to the barbed tip;
   a clamp including:
      two legs extending substantially parallel with each other and spaced apart from each other by a maximum second distance;
      an apex portion connecting the two legs to each other so that the clamp is shaped substantially in the form of an inverted "U"; and
      an opening in the apex portion, the opening being sized to receive the inlet rod of the spike;
   wherein, the second distance is sized to snugly receive the conduit of standard diameter between the legs, whereby the inlet rod of the spike is receivable through the opening in the apex portion;
   further wherein the outlet rod extends substantially perpendicular to the inlet rod and a plate is attached to the spike, the plate extending substantially perpendicular to the inlet rod, the plate being positioned to form an uppermost planar surface of the spike, and further wherein the plate is dimensioned to have a width that is greater than the maximum second distance; and
   further wherein the clamp has a first width, and wherein the clamp further includes two opposing shaping surfaces, each shaping surface attached to a leg and having a second width, wherein the first width and the second width are each dimensions measured perpendicular to both the second distance and to the inlet rod, and wherein the second width is not more than 30 percent of the first width, the shaping surfaces being spaced apart from each other by a fourth distance not more than 90 percent of the second distance.

2. The clamp and spike combination of claim 1, wherein a mating detent is positioned in the opening and on the inlet rod, whereby, once the spike is received by the clamp, the spike is restrained by the detents from removal from the clamp.

* * * * *